(12) United States Patent
Heyrman et al.

(10) Patent No.: US 8,255,639 B2
(45) Date of Patent: Aug. 28, 2012

(54) PARTITION TRANSPARENT CORRECTABLE ERROR HANDLING IN A LOGICALLY PARTITIONED COMPUTER SYSTEM

(75) Inventors: Peter Joseph Heyrman, Rochester, MN (US); Naresh Nayar, Rochester, MN (US); Gary Ross Ricard, Chatfield, MN (US)

(73) Assignee: International Business Machines Corporation, Armonk, NY (US)

( * ) Notice: Subject to any disclaimer, the term of this patent is extended or adjusted under 35 U.S.C. 154(b) by 583 days.

(21) Appl. No.: 12/115,613

(22) Filed: May 6, 2008

(65) Prior Publication Data
US 2009/0282210 A1  Nov. 12, 2009

(51) Int. Cl.
G06F 12/16 (2006.01)
G06F 12/06 (2006.01)
(52) U.S. Cl. .............. 711/153; 711/165; 711/E12.103; 714/6.13
(58) Field of Classification Search .............. 711/153, 711/165, E12.103; 714/5, 6.13
See application file for complete search history.

(56) References Cited

U.S. PATENT DOCUMENTS

| | | | |
|---|---|---|---|
| 5,267,242 A | | 11/1993 | Lavallee et al. |
| 6,075,938 A | * | 6/2000 | Bugnion et al. ............. 703/27 |
| 7,028,216 B2 | | 4/2006 | Aizawa et al. |
| 7,058,782 B2 | | 6/2006 | Henderson et al. |
| 7,313,721 B2 | | 12/2007 | Ashmore |
| 7,444,543 B2 | | 10/2008 | Babudri et al. |
| 7,484,208 B1 | * | 1/2009 | Nelson .............................. 718/1 |
| 2005/0028039 A1 | * | 2/2005 | Henderson et al. ............. 714/42 |
| 2006/0236165 A1 | * | 10/2006 | Cepulis et al. ................ 714/721 |
| 2007/0061612 A1 | | 3/2007 | Henderson et al. |
| 2007/0288720 A1 | * | 12/2007 | Cholleti et al. ............... 711/202 |
| 2008/0005495 A1 | * | 1/2008 | Lowe et al. ................... 711/152 |
| 2008/0147945 A1 | * | 6/2008 | Zimmer et al. ............... 710/260 |
| 2008/0235477 A1 | * | 9/2008 | Rawson ........................ 711/165 |
| 2009/0043985 A1 | * | 2/2009 | Tuuk et al. .................... 711/205 |
| 2009/0063835 A1 | * | 3/2009 | Yao et al. .......................... 713/2 |
| 2009/0249366 A1 | * | 10/2009 | Sen et al. ....................... 719/327 |

\* cited by examiner

*Primary Examiner* — Hal Schnee
(74) *Attorney, Agent, or Firm* — Martin & Associates, LLC; Bret J. Petersen (57) ABSTRACT

A method and apparatus for transparently handling recurring correctable errors to prevent costly system shutdowns for correctable memory errors or system failures from uncorrectable memory errors. When a high number of correctable errors are detected for a given memory location, the hypervisor moves the data associated with the memory location to an alternate physical memory location transparently to the partition such that the partition has no knowledge that the physical memory actualizing the memory location has been changed. Similarly, the hypervisor can move direct memory access (DMA) memory locations using an I/O translation table.

15 Claims, 7 Drawing Sheets

PARTITION TRANSPARENT CORRECTABLE ERROR HANDLING IN A LOGICALLY PARTITIONED COMPUTER SYSTEM

CROSS REFERENCE TO RELATED APPLICATIONS

This application is related to a co-filed application, application Ser. No. 12/115,625, by the same inventors herein and titled "Partition Transparent Memory Error Handling In A Logically Partitioned Computer System With Mirrored Memory".

BACKGROUND

1. Technical Field

This disclosure generally relates to multi-partition computer systems, and more specifically relates to a method and apparatus for transparent correctable error handling in a logically partitioned computer system.

2. Background Art

Computer systems typically include a combination of hardware and software. The combination of hardware and software on a particular computer system defines a computing environment. Different hardware platforms and different operating systems thus provide different computing environments. It was recognized that it is possible to provide different computing environments on the same physical computer system by logically partitioning the computer system resources into different computing environments. The logical portioning allows multiple operating systems and processes to share the hardware resources of a host computer. The eServer computer system developed by International Business Machines Corporation (IBM) is an example of a computer system that supports logical partitioning. For logical partitioning on an eServer computer system, a firmware partition manager called a "hypervisor" allows defining different computing environments on the same platform. The hypervisor manages the logical partitions to assure that they can share needed resources in the computer system while maintaining the separate computing environments defined by the logical partitions.

Processes on computer systems today are generally at the mercy of an uncorrectable memory error. When such an error occurs, the process or the entire partition itself must be terminated since a load instruction cannot be completed. Furthermore, the frequency of such errors appears to be exacerbated by newer, denser memory chips with smaller dies and faster clocks. Prior solutions to address this situation usually involve identifying a bad area of memory or affected area via a high frequency of correctable errors and attempting to deactivate the bad memory area the next time the partition is powered off. This solution can leave a critical system operating with a potential fatal error until it can be shut down for maintenance. Alternately, the OS can try to dynamically free up the memory that is incurring the correctable errors, but the OS may not be able to free up memory if it contains critical operating systems processes or data. In either case, it is preferable to address the problem memory before the correctable error becomes an uncorrectable error and the process or partition must be terminated.

Shutting down the computer system to prevent system failure from correctable and uncorrectable memory errors is a costly and inefficient solution. Without a way to transparently handle recurring correctable errors, it will continue to be necessary to shut down complex computer systems to deal with correctable memory errors before the memory errors become uncorrectable and cause the system to fail.

BRIEF SUMMARY

The disclosure and claims herein are directed to a method and apparatus for transparently handling recurring correctable errors to prevent costly system shutdowns for correctable memory errors or system failures from uncorrectable memory errors. When a high number of correctable errors are detected for a given memory location, the hypervisor moves the data associated with the memory location to an alternate physical memory location transparently to the partition such that the partition has no knowledge that the physical memory actualizing the logical memory location has been changed. Similarly, the hypervisor can move direct memory access (DMA) memory locations using an I/O address translation table.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

1.0 Overview

The present invention relates to logical memory blocks (LMBs) in a logically partitioned computer systems. For those not familiar with the concepts of logical partitions, this Overview section will provide background information that will help to understand the present invention.

Figure 2:
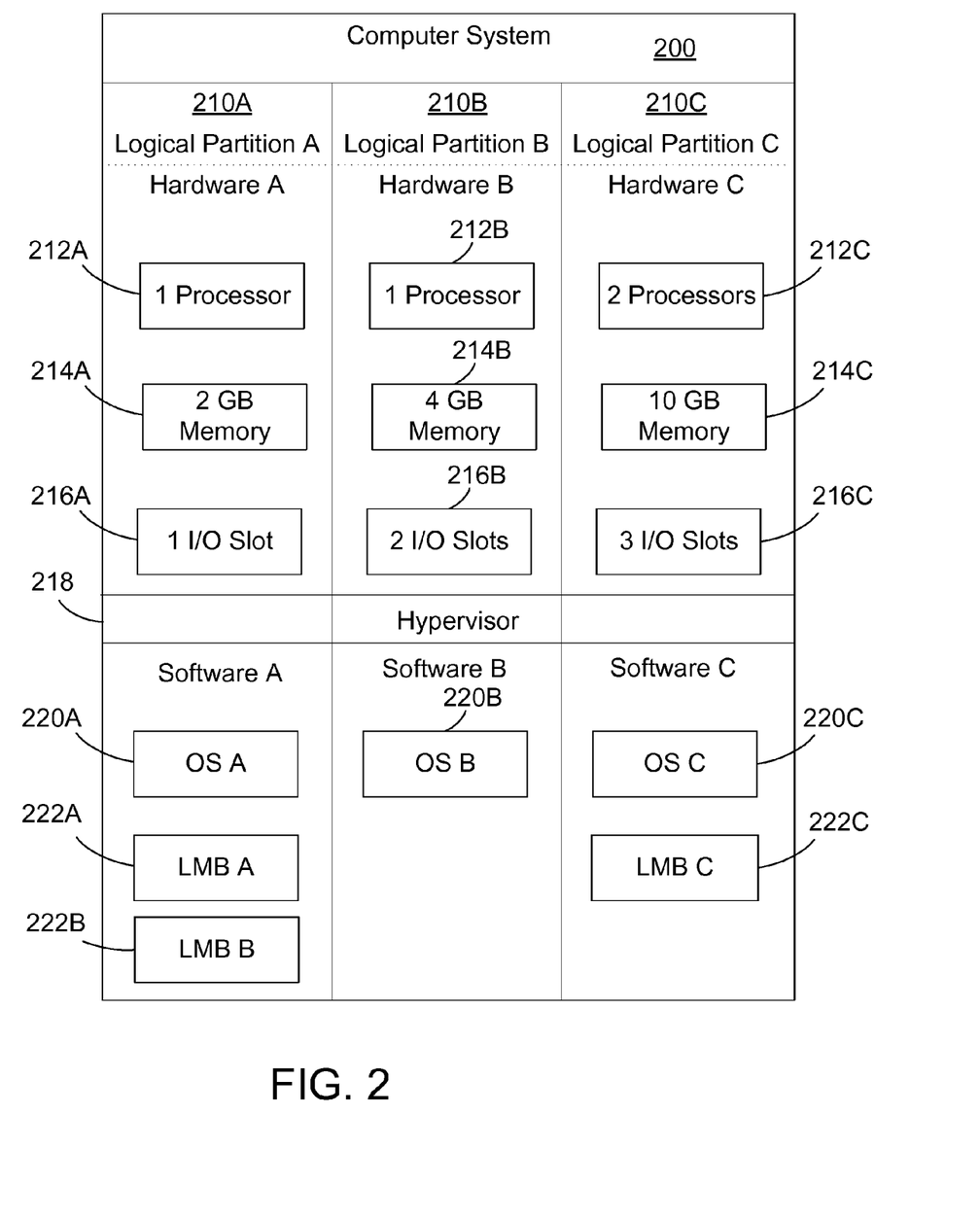
FIG. 2 is a block diagram of a prior art partitioned computer system.

As stated in the Background Art section above, a computer system may be logically partitioned to create multiple virtual machines on a single computer platform. For an example, we assume that we create a sample computer system to include four processors, 16 GB of main memory, and six I/O slots. Note that there may be many other components inside the sample computer system that are not shown for the purpose of simplifying the discussion herein. We assume that our sample computer system 200 is configured with three logical partitions 210A-C, as shown in FIG. 2. The first logical partition 210A is defined to have one processor 212A, 2 GB of memory 214A, and one I/O slot 216A. The second logical partition 210B is defined to have one processor 212B, 4 GB of memory 214B, and 2 I/O slots 216B. The third logical partition 210C is defined to have two processors 212C, 10 GB of memory 214C, and three I/O slots 216C. Note that the total number of processors 210A+210B+210C equals the four processors in the computer system. Likewise for the memory and I/O slots.

A hypervisor (or partition manager) 218 is a firmware layer that is required for a partitioned computer to interact with hardware. The hyperviser 218 manages LMBs and the logical partitions to assure that they can share needed resources in the computer system while maintaining the separate computing environments defined by the logical partitions. With hardware resources allocated to the logical partitions, software is installed as shown in FIG. 2. An operating system is installed in each partition, followed by utilities or applications as the specific performance needs of each partition require. The operating systems, utilities and applications are installed in one or more logical memory blocks (LMBs). Thus, for the example in FIG. 2, the first logical partition 210A includes an operating system in a first LMB 220A, and two additional LMBs 222A, 222B. The second logical partition 210B includes an operating system LMB 220B. The third logical partition 210C includes an operating system LMB 220C, and another LMB C 222C.

2.0 Detailed Description

The claims and disclosure herein provide a method and apparatus for transparent correctable error handling in a partitioned computer system.

Figure 1:
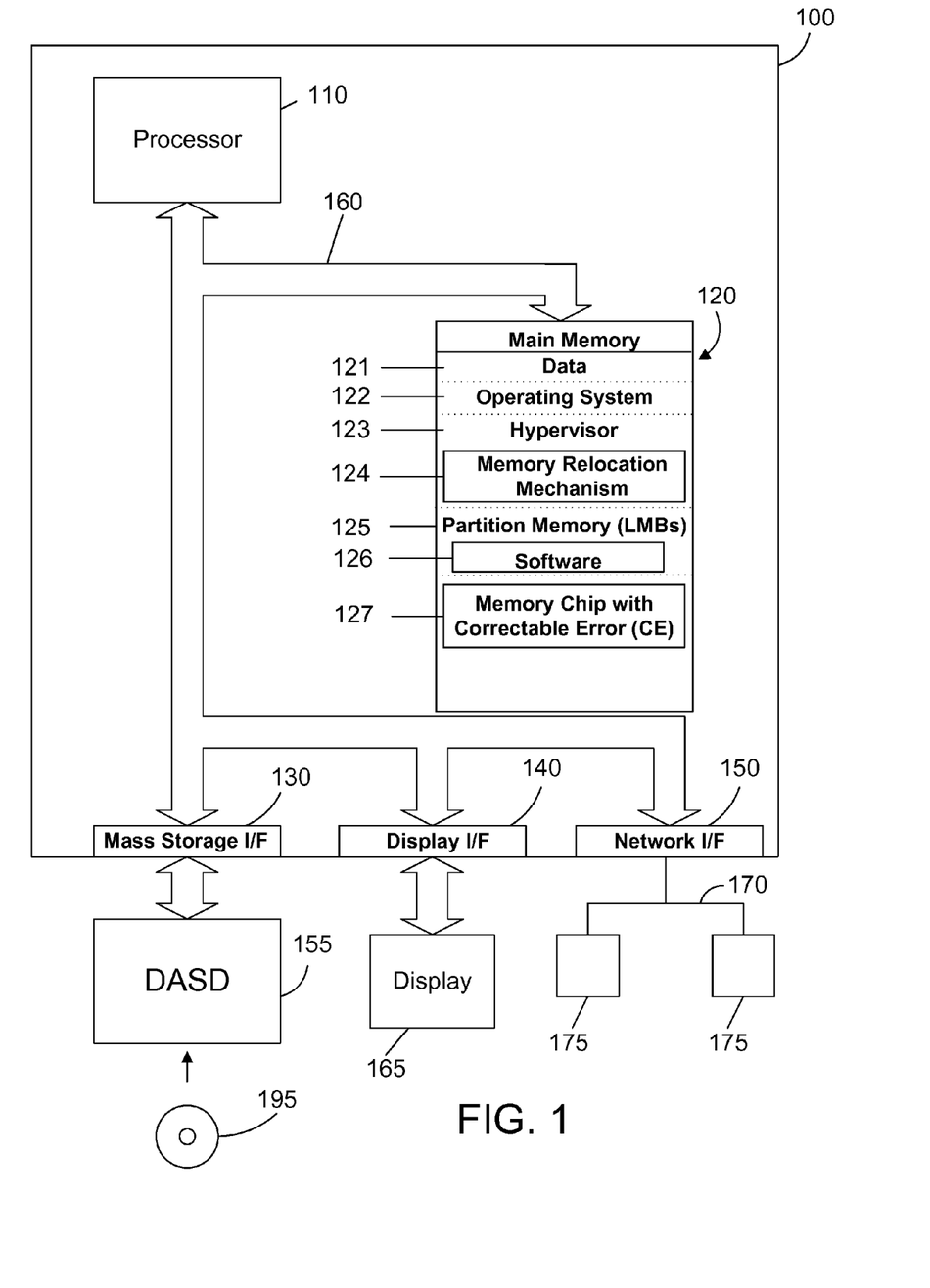
FIG. 1 is a block diagram of an apparatus with a memory relocation mechanism for transparent correctable error handling in a partitioned computer system.

Referring to FIG. 1, a computer system 100 is one suitable implementation of a computer system that includes a memory relocation mechanism to facilitate efficient relocation of LMBs in partitioned memory. Computer system 100 is an IBM eServer computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD-RW drive, which may store data to and read data from a CD-RW 195.

Main memory 120 preferably contains data 121 and an operating system 122. Data 121 represents any data that serves as input to or output from any program in computer system 100. Operating system 122 is a multitasking operating system known in the industry as eServer OS; however, those skilled in the art will appreciate that the spirit and scope of this disclosure is not limited to any one operating system. The memory further includes a hypervisor 123 that contains a memory relocation mechanism 124, a partition memory 125 with software 126, and a portion of memory that is characterized as a memory chip with a correctable error 127. Each of these entities in memory is described further below.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, hypervisor 123, memory relocation mechanism 124, partition memory 125, software 126, and the memory chip with the correctable error 127 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122.

Although computer system 100 is shown to contain only a single processor and a single system bus, those skilled in the art will appreciate that a memory relocation mechanism may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

At this point, it is important to note that while the description above is in the context of a fully functional computer system, those skilled in the art will appreciate that the memory relocation mechanism described herein may be distributed as an article of manufacture in a variety of forms, and the claims extend to all suitable types of computer-readable media used to actually carry out the distribution, including recordable media such as floppy disks and CD-RW (e.g., 195 of FIG. 1).

Embodiments herein may also be delivered as part of a service engagement with a client corporation, nonprofit organization, government entity, internal organizational structure, or the like. These embodiments may include configuring a computer system to perform some or all of the methods described herein, and deploying software, hardware, and web services that implement some or all of the methods described herein.

Figure 3:
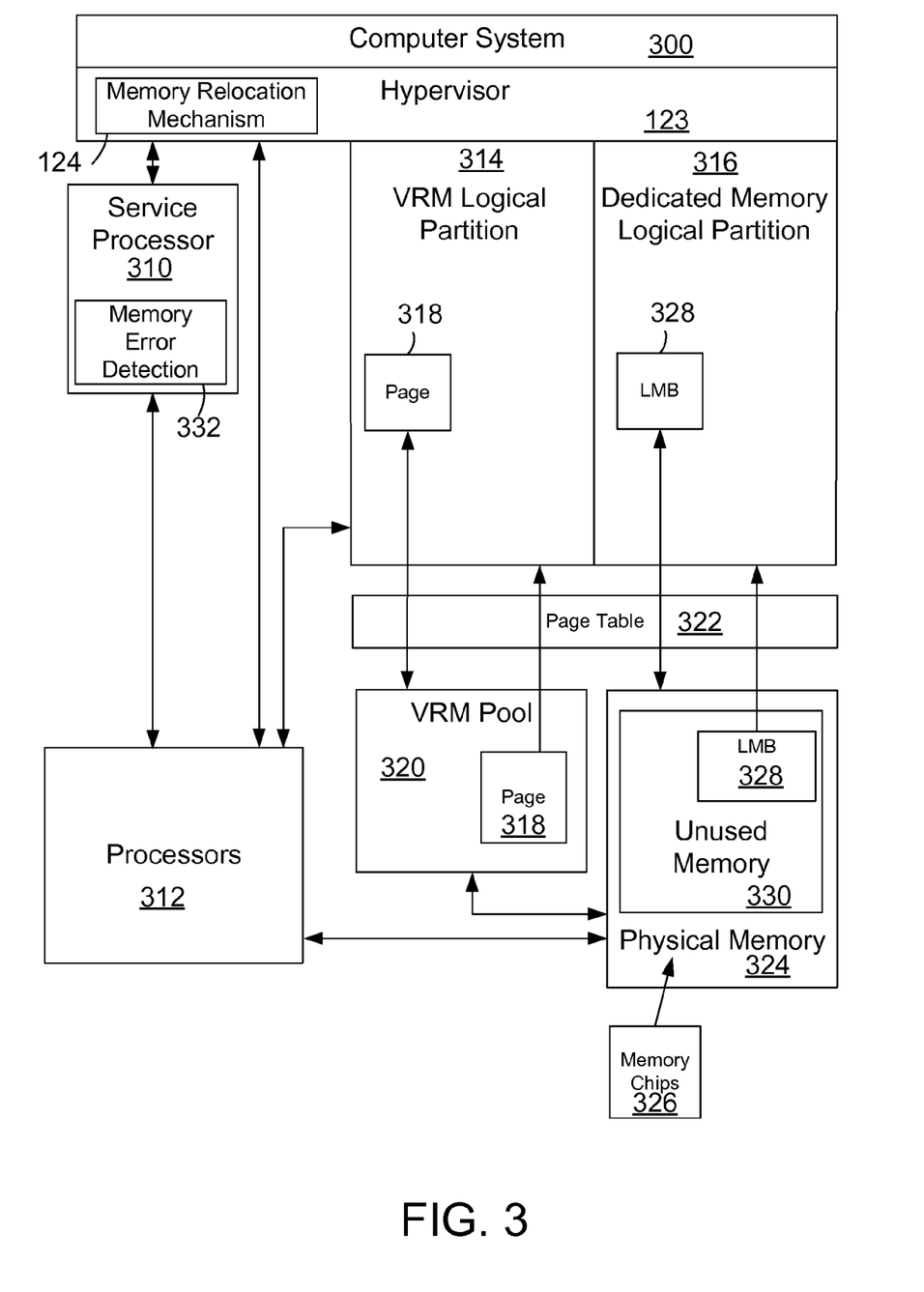
FIG. 3 is a block diagram of virtual partitioned memory in a partitioned computer system with transparent correctable error handling.

FIG. 3 is a block diagram of a logically partitioned computer system that supports transparent correctable error handling. FIG. 3 represents a portion of a computer system 300 that may include the other features of a partitioned computer system as described above with reference to FIGS. 1 and 2. Computer system 300 includes a hypervisor 123 that allocates memory to the logical partitions and handles memory access to the logical memory. The hypervisor 123 communicates with a service processor 310 and the processors 312. A memory relocation mechanism 123 is located within the hypervisor 123 or operates in conjunction with the hypervisor to provide the relocation of the memory as described further below. The service processor 310 monitors the processors for abnormal conditions and notifies the hypervisor 123. The logical partition memory is divided into a virtual real memory (VRM) logical partition 314 and a dedicated memory logical partition 316. The VRM logical partition is allocated a number of pages 318 by the hypervisor 123 from the VRM pool 320. The page table 322 records the real memory addresses for each page 318 in physical memory 324. Similarly, the dedicated memory logical partition 316 is allocated a number of LMBs 320 by the hypervisor 123 from the physical memory 324. The page table 322 also records the real memory addresses for each LMB 328 in physical memory 324.

The physical memory 324 comprises a number of physical memory chips 326. The physical memory 324 includes the unused memory 330. The unused memory 330 may include memory that has not been assigned to a logical partition and capacity upgrade on demand memory (CUoD). CUoD memory is memory that is installed on a user's machine but is not activated until the user pays for an upgrade to use the memory. As described herein, the CUoD memory may be used to replace bad memory without the customer's knowledge or without the customer needing to purchase the memory.

Again referring to FIG. 3, the service processor 310 includes a memory error detection mechanism 332. The memory error detection mechanism 332 may also reside in the processors 312. The memory error detection mechanism 332 comprises hardware and software that detect and record the number of correctable errors that occur in the memory chips 326 as known in the prior art. When the number of correctable errors reaches a threshold, the memory relocation mechanism 124 is activated in the hypervisor 123 to transparently relocate the contents of the memory page or LMB associated with the affected memory chip to a new physical memory location as described herein. The relocated memory contents may include operating system software as described above with reference to FIG. 2.

Figure 4:
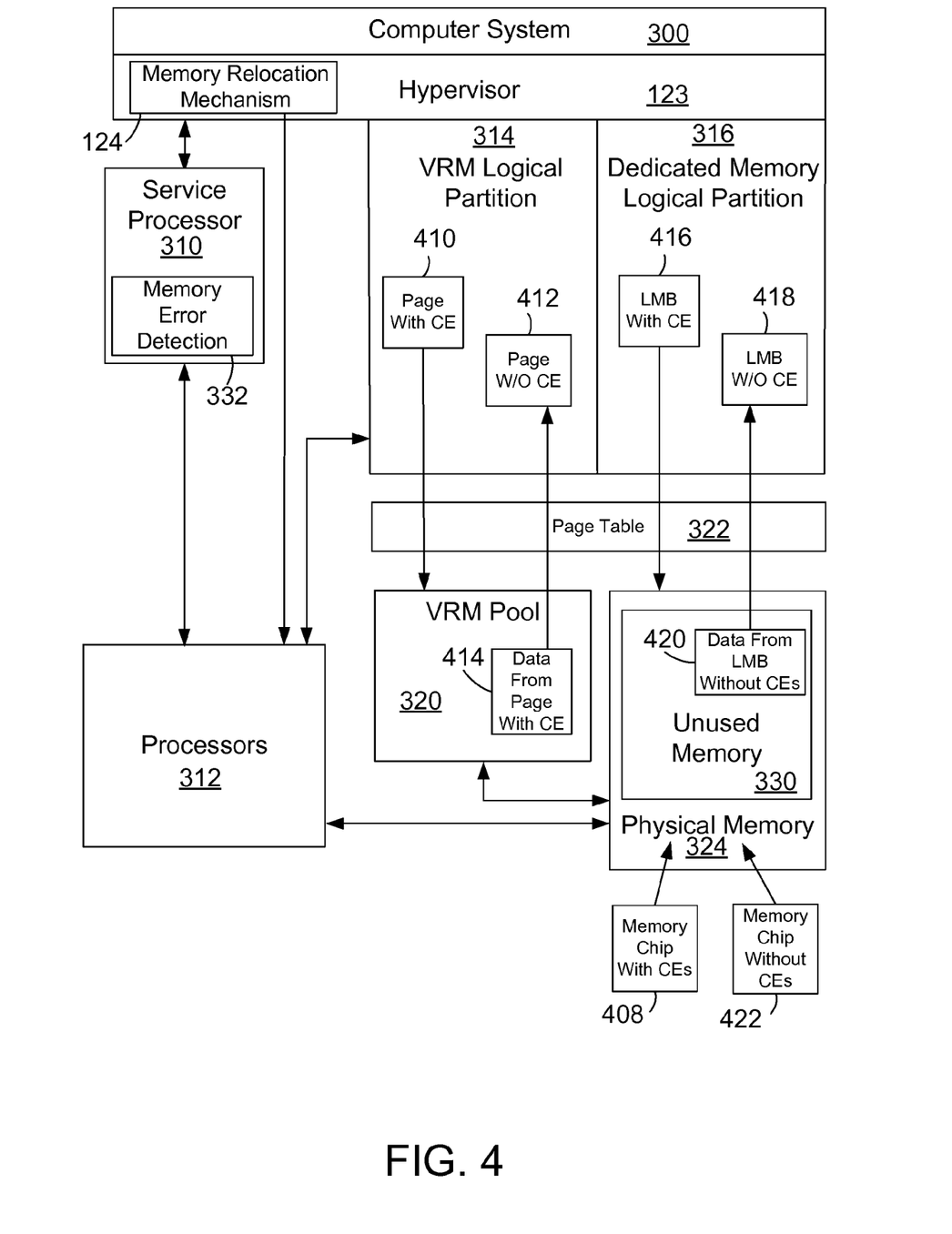
FIG. 4 is another block diagram of a virtual partitioned memory in a partitioned computer system with transparent correctable error handling.

FIG. 4 shows additional detail of the logically partitioned computer system 300 described above with reference to FIG. 3. FIG. 4 shows an example of relocating memory in a logically partitioned computer system for transparent correctable error handling. We will first consider an example of relocating a page of memory in a VRM logical partition 314. The memory error detection mechanism 332 detects a number of correctable memory errors in a memory chip 408 that is associated with a page 410 in the VRM logical partition 314. The memory relocation mechanism 124 in the hypervisor 123 is activated by the memory error detection mechanism 332 when the error is above a predetermined threshold. If necessary, the memory relocation mechanism 124 places the processors 312 in virtual partition memory (VPM) mode so that the memory relocation mechanism 124 will have control of all memory storage through the page table 322. In the IBM eServer machine used for this example, the processors of a VRM logical partition are always in VPM mode, so there is no need for this step for a VRM logical partition. The memory relocation mechanism places the page with the correctable errors 410 in the VRM pool 320 and allocates a new page 412 to the VRM logical partition 314. The new page 412 is associated with a memory chip that does not have correctable errors 422. The memory relocation mechanism then copies the data 414 from the page with the correctable errors to the newly allocated page without correctable errors 412. The page table is updated to reflect the new location of the page 412 to complete the transparent relocation of the page in the VRM logical partition 314. Alternatively, the page with correctable errors can be removed from the list of free pages in the VRM pool so the page will no longer be used.

Again referring to FIG. 4, we next consider an example of relocating a LMB in a dedicated memory logical partition 316. Similar to the previous example, the memory error detection mechanism 332 detects a number of correctable memory errors in a memory chip 408 that is associated with a LMB 416 in the dedicated memory logical partition 316. The memory relocation mechanism 124 in the hypervisor 123 is activated by the error detection mechanism 332 when the error is above a predetermined threshold. The memory relocation mechanism 124 places the processors for the dedicated memory logical partition 316 having the LMB 416 with correctable errors in virtual partition memory (VPM) mode so that the memory relocation mechanism 124 will have control of all memory storage through the page table 322. In VPM mode, the hypervisor gets control of data storage and instruction storage interrupts. Hypervisor resources are used to present these interrupts to the hypervisor. The memory relocation mechanism places the LMB with the correctable errors 416 in the unused memory 330 and allocates a new LMB 418 to the dedicated memory logical partition 316. The memory relocation mechanism 124 then copies the data 420 from the LMB with the correctable errors to the newly allocated LMB without correctable errors 418. The page table 322 is updated to reflect the new location of the page 412. The memory relocation mechanism 124 then takes the processors out of VPM mode to complete the transparent relocation of the page in the dedicated memory logical partition 316. Note, relocation of the LMB may be done a few pages at a time.

Figure 5:
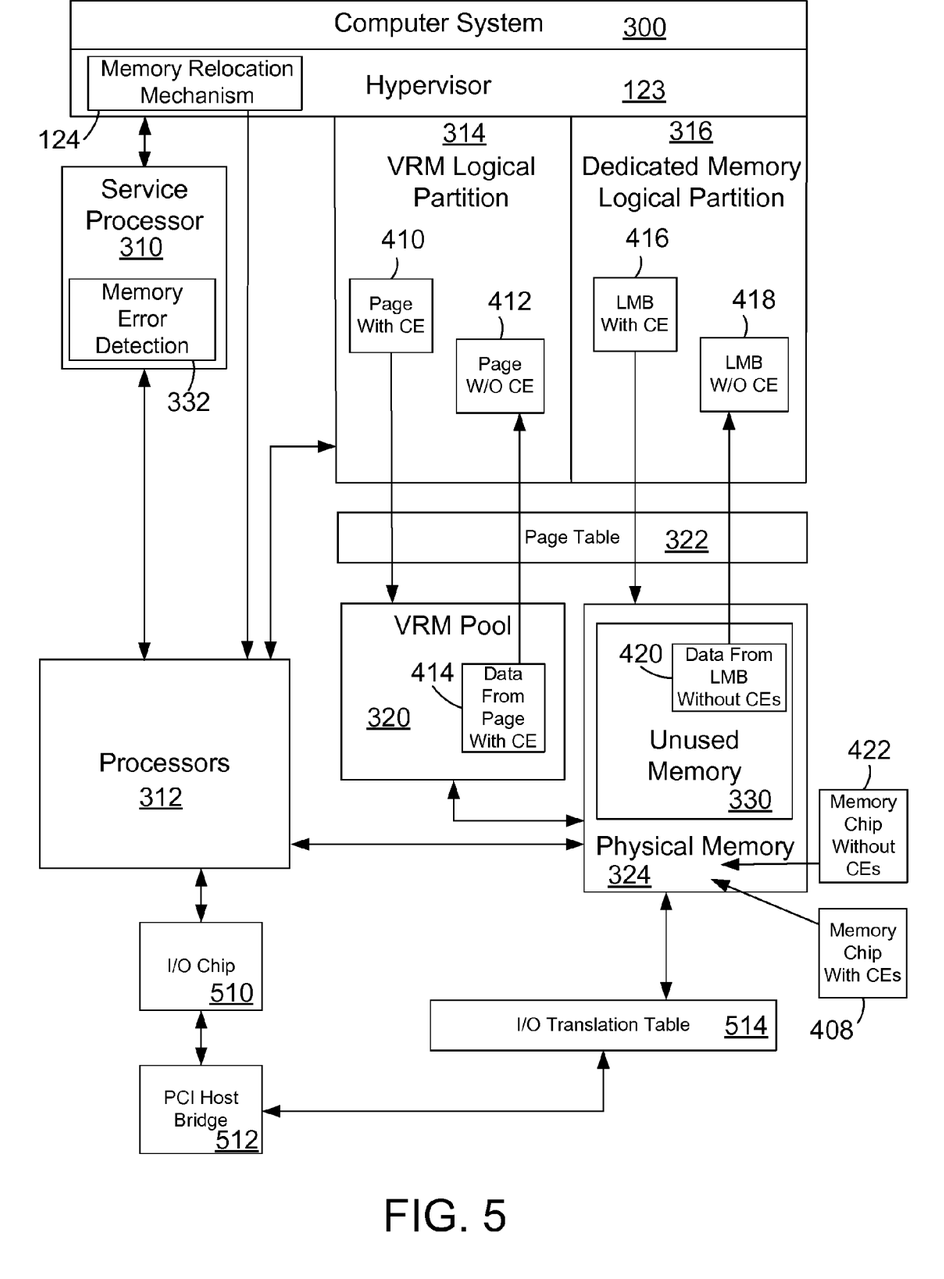
FIG. 5 is another block diagram of a virtual partitioned memory in a partitioned computer system with transparent correctable error handling for DMA transfers.

Transparent relocation of memory as described herein can also be done where the memory is accessed by direct memory access (DMA). DMA access to memory in a logically partitioned computer system may be accomplished as illustrated in FIG. 5. The processors 312 communicate through an I/O chip 510 to a bus bridge, which in the illustrated example is a PCI host bridge 512. The PCI host bridge 512 then communicates through an I/O address translation table 514 to the physical memory 324. The access to memory through the I/O address translation table is analogous to the access through the page table 322 described above. During relocation of memory as described above, the memory relocation mechanism must ensure that DMA into the affected memory (memory with the high number of correctable errors) is disabled before relocation of the memory contents. This is accomplished by disabling arbitration on the PCI host bridge's I/O chips or the equivalent I/O chips that have access to a page within the LMB that is being relocated. Further, any existing DMAs to the logical partition memory are flushed. If a processor tries to access an LMB page or fetch instructions while the page relocation is in progress, it will get a data/instruction storage interrupt and will spin waiting for the relocation operation to complete. If the page being relocated is mapped in an I/O address translation table 514, the entries in the I/O address translation table must be updated for the relocation in the same manner as described above for the page table.

Figure 6:
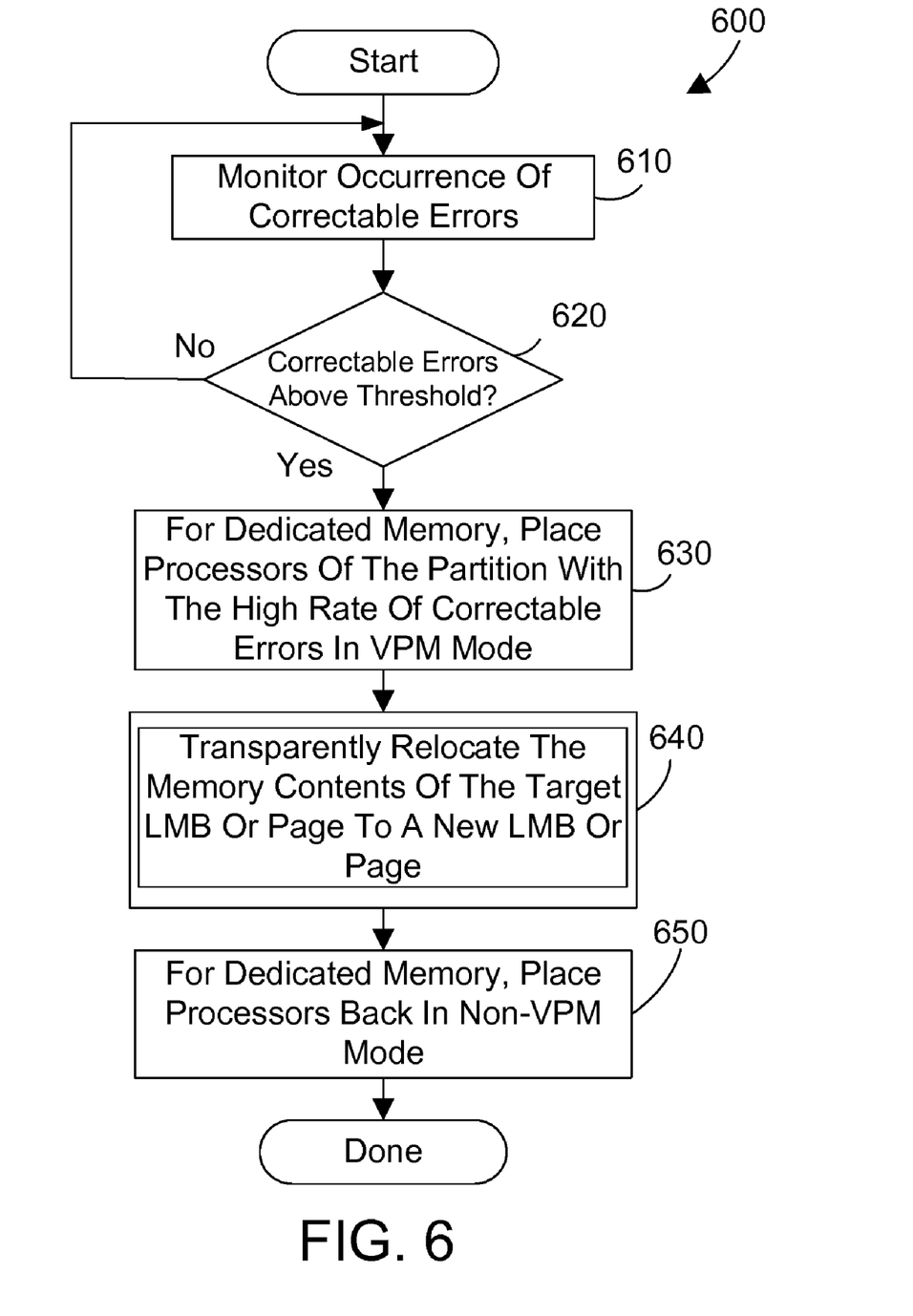
FIG. 6 is a method flow diagram that illustrates a method for transparent correctable error handling in a partitioned computer system.

FIG. 6 shows a method 600 for transparently handling recurring correctable errors in a partitioned computer system. The steps in method 600 are preferably performed by the memory relocation mechanism 124 in the Hypervisor 123 shown in FIG. 1. First, monitor the occurrence of correctable errors (step 610) and determine if there are correctable errors at a memory location above a threshold, where errors above a threshold could be a selected number of error for a unit of time (step 620). If there are not correctable errors above a threshold (step 620=no) then proceed with memory operations in the partition normally and continue to monitor the occurrence of correctable errors (step 610). If there are correctable errors above a threshold in a portion of memory (step 620=yes), then for dedicated memory, place the processors of the partition with the high rate of correctable errors in VPM mode to allow a hypervisor to control all of the partition's processors access to the memory (step 630). Then transparently relocate the memory contents of the target LMB or Page to a new LMB or Page (step 640). Finally, for dedicated memory, place the processors back in non-VPM mode (step 650). The method is then done.

Figure 7:
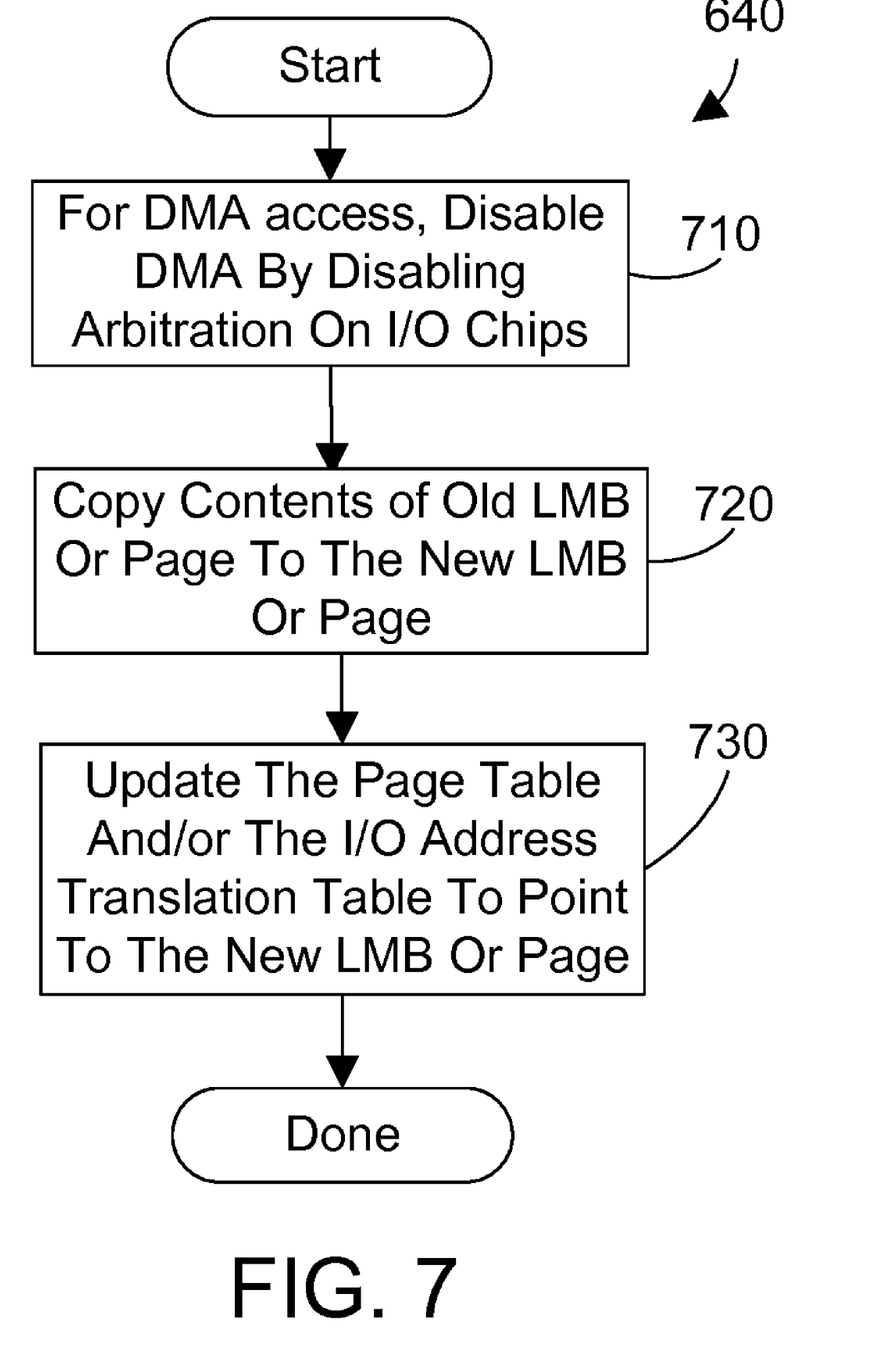
FIG. 7 is method flow diagram that illustrates a possible implementation of step 640 in FIG. 6.

FIG. 7 shows a method 640 to transparently relocate the memory contents of the target LMB to a new LMB. Method 640 is one suitable implementation for step 640 in FIG. 6. First, for DMA access to the affected memory, disable arbitration on the PCI host bridges or equivalent I/O chips that have access to pages in the LMB where the memory errors occurred (step 710). Copy the LMB or Page to the new LMB or Page (step 720). Finally, update the page table (for regular memory access) or the I/O translation table (for DMA access) with the new LMB information (step 730). The method is then done.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

What is claimed is:

1. A logically partitioned computer system comprising:
   a plurality of processors;
   a memory coupled to the plurality of processors having memory for a plurality of logical partitions designated by a hypervisor;
   a memory block with data in a first logical partition of virtual memory allocated to a memory chip;
   a memory error detection mechanism that determines a number of correctable errors above a predetermined threshold occur when accessing the memory block;
   a memory relocation mechanism incorporated into the hypervisor that transparently relocates the data of the memory block with correctable errors to a newly allocated memory block by moving the data of the memory block to an alternate physical memory location transparently to the first logical partition such that the first logical partition including an operating system on the first logical partition has no knowledge that a physical memory location of the memory block in the virtual memory has changed; and
   wherein the memory block is a logical memory block (LMB) of a dedicated memory logical partition and wherein the memory relocation mechanism places processors of the first logical partition having the memory block with correctable errors in a virtual partition memory (VPM) mode where the memory relocation mechanism has control of all memory storage through a page table.

2. The logically partitioned computer system of claim 1 wherein the memory block is a page in a virtual real memory logical partition.

3. The logically partitioned computer system of claim 1 wherein the relocated data is operating system software.

4. The logically partitioned computer system of claim 1 wherein the memory relocation mechanism flushes running direct memory accesses (DMAs) before relocating the data.

5. A computer-implemented method for transparently relocating partition memory, the method comprising the steps of:
   (A) monitoring the occurrence of correctable errors in memory chips associated with data of a memory block in a first logical memory partition of virtual memory;
   (B) where the occurrence of correctable errors in the memory block is above a pre-determined threshold, performing the steps of:
      (1) for dedicated memory, placing a processor of the first logical memory partition in virtual partition memory (VPM) mode that allows a hypervisor to control all of the processor's access to the virtual memory;
      (2) transparently relocating the data of the memory block to a newly allocated memory block associated with a memory chip without memory errors by moving the data of the memory block to an alternate physical memory location transparently to the first logical memory partition such that the first logical memory partition including an operating system on the first logical memory partition has no knowledge that a physical memory location of the memory block in the virtual memory has changed; and
      (3) for dedicated memory, placing the processor of the first logical memory partition in non-VPM mode.

6. The method of claim 5 wherein the memory block is a logical memory block (LMB).

7. The method of claim 6 further comprising the steps of:
   copying data from the memory block to a newly allocated LMB; and
   updating a page table to point to the newly allocated LMB.

8. The method of claim 6 further comprising the steps of:
   disabling DMA into the LMB by disabling arbitration on I/O Chips that have access to pages in the LMB;
   flushing running direct memory accesses (DMAs); and
   updating an I/O address translation table.

9. A method for deploying computing infrastructure, comprising integrating computer readable code into a computing system, wherein the code in combination with the computing system perform the method of claim 5.

10. A computer-implemented method for transparently relocating partition memory, the method comprising the steps of:
   (A) monitoring the occurrence of correctable errors in memory chips associated with a memory block in a first logical memory partition of virtual memory;
   (B) where the occurrence of correctable errors in the memory block is above a pre-determined threshold, performing the steps of:
      (1) placing processors of the first logical memory partition in virtual partition memory (VPM) mode that allows a hypervisor to control all access to the logical memory partition;
      (2) transparently relocating the contents of the memory block to a newly allocated memory block associated with a memory chip without memory errors by moving the data of the memory block to an alternate physical memory location transparently to the first logical memory partition such that the first logical memory partition including an operating system on the first logical partition has no knowledge that a physical memory location of the memory block in the virtual memory has changed;

(C) placing the processors of the first logical memory partition in non-VPM mode;

(D) copying data from the memory block to a newly allocated logical memory block (LMB);

(E) updating a page table to point to the newly allocated LMB; and (F) where the access to memory is direct memory access (DMA), disabling DMA into the newly allocated LMB by disabling arbitration on I/O chips that have access to pages in the newly allocated LMB, flushing running DMAs and updating an I/O translation table.

11. An article of manufacture comprising:

a memory error detection mechanism that determines a number of correctable errors above a predetermined threshold occur when accessing a memory chip associated with a memory block of a first logical memory partition of virtual memory in a computer system with multiple processors;

a memory relocation mechanism incorporated into a hypervisor that transparently relocates the data of the memory block to a newly allocated memory block by moving data of the memory block to an alternate physical memory location transparently to the first logical memory partition such that the first logical memory partition including an operating system on the first logical partition has no knowledge that a physical memory location of the memory block in the virtual memory has changed;

wherein the memory relocation mechanism places a processor of the logical memory partition having the memory block with correctable errors in virtual partition memory (VPM) mode so that the memory relocation mechanism will have control of all memory storage through a page table; and computer-readable non-transitory media bearing the error detection mechanism and the memory relocation mechanism.

12. The article of manufacture of claim 11 wherein the memory block is a page in a virtual real memory logical partition.

13. The article of manufacture of claim 11 wherein the memory block is a logical memory block (LMB) of a dedicated memory logical partition.

14. The article of manufacture of claim 11 wherein the relocated data is operating system software.

15. The article of manufacture of claim 11 wherein the memory relocation mechanism flushes running direct memory accesses (DMAs) before relocating the data.

* * * * *